United States Patent
Gassmann et al.

(10) Patent No.: US 6,394,246 B1
(45) Date of Patent: May 28, 2002

(54) TWIN-COUPLING WITH IMPROVED BRAKING STABILITY AND LESS TORSION

(75) Inventors: Theodor Gassmann, Rochester, MI (US); Paul-Erich Schönenbrücher, Much (DE)

(73) Assignee: GKN Viscodrive GmbH, Lohmar (DE)

( * ) Notice: Subject to any disclaimer, the term of this patent is extended or adjusted under 35 U.S.C. 154(b) by 0 days.

(21) Appl. No.: 09/389,920

(22) Filed: Sep. 3, 1999

(30) Foreign Application Priority Data

Sep. 4, 1998 (DE) .......................................... 198 40 326

(51) Int. Cl.⁷ ............................................. F16H 48/12
(52) U.S. Cl. ..................... 192/35; 74/650; 192/48.8; 192/103 F
(58) Field of Search .............................. 192/35, 103 F, 192/48.8; 74/650; 180/197, 249

(56) References Cited

U.S. PATENT DOCUMENTS

| | | | | |
|---|---|---|---|---|
| 4,031,780 A | * | 6/1977 | Dolan et al. .............. | 192/35 X |
| 5,036,963 A | * | 8/1991 | Murata ........................ | 192/35 |
| 5,632,185 A | * | 5/1997 | Gassmann ................... | 74/650 |
| 5,690,201 A | * | 11/1997 | Gassmann ................... | 192/35 |
| 5,890,573 A | * | 4/1999 | Kwoka ........................ | 192/35 |
| 5,984,039 A | * | 11/1999 | Mayr ........................ | 192/35 X |

FOREIGN PATENT DOCUMENTS

| | | | |
|---|---|---|---|
| DE | 38 21 773 A1 | * 1/1989 | |
| DE | 40 21 747 C2 | * 1/1992 | |
| JP | 62-170836 | 10/1987 | |
| JP | 64-4537 | * 1/1989 | .................. 180/249 |

* cited by examiner

Primary Examiner—Rodney H. Bonck

(57) ABSTRACT

A method of and apparatus for controlling an axle drive for the purpose of distributing torque from a propulsion shaft to two axle shafts, having a coupling carrier which is rotatably supported in a axle drive housing, and two controllable friction couplings arranged in the coupling carrier and provided for engageably connecting and driving the axle shafts, with first friction plates of each friction coupling being non-rotatably connected to the coupling carrier and with second friction plates of each friction coupling being non-rotatably connected to the respective axle shaft, and having two actuating devices for the two friction couplings, which actuating devices, when the two axle shafts both rotate in the same direction relative to the coupling carrier, function autonomously independently of one another, and when the two axle shafts rotate in opposite directions relative to the coupling carrier, the actuating devices are shut down.

10 Claims, 6 Drawing Sheets

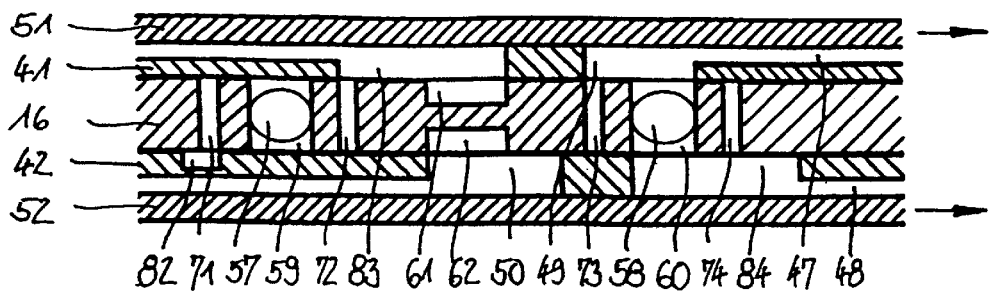
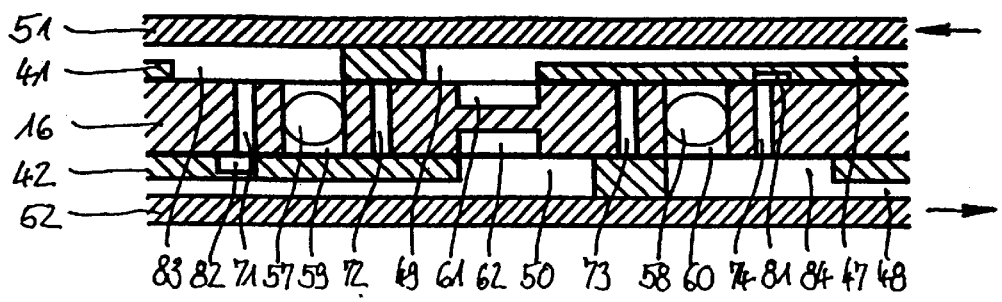
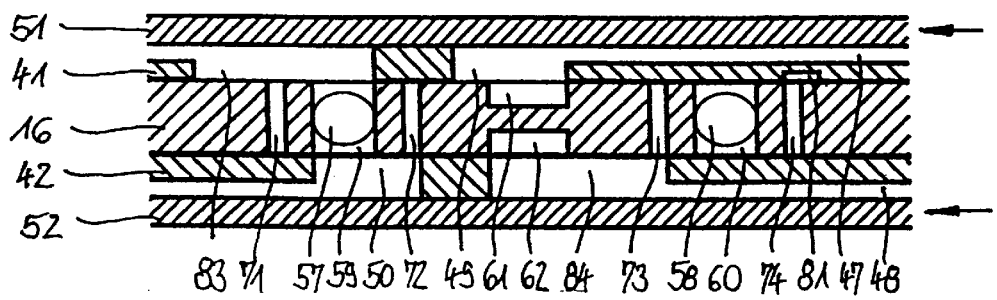
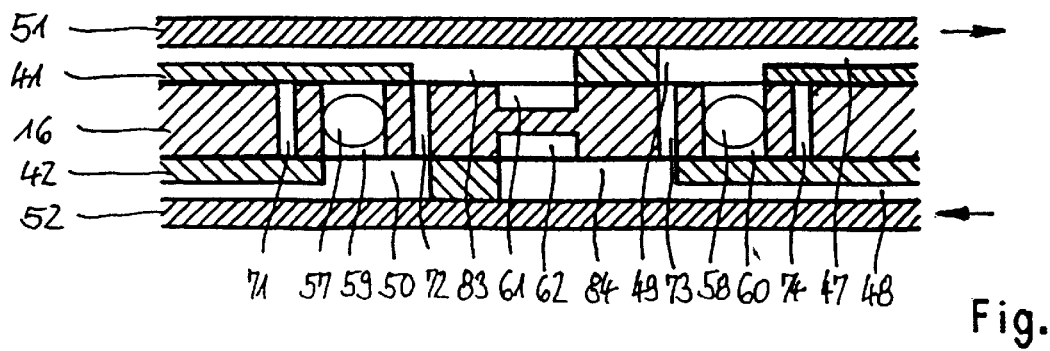
Fig. 4

TWIN-COUPLING WITH IMPROVED BRAKING STABILITY AND LESS TORSION

BACKGROUND OF THE INVENTION

Axle drives of the type which transfer torque in motor vehicles by means of a double coupling are known from DE 40 21 747 C2. Actuation takes place by a single, shared actuating device which uniformly loads both friction couplings and which must be provided with an external energy supply unit and an external controlling device. It is possible for the double coupling to be controlled independently of the various operating parameters, but it is then necessary to provide additional means for controlling the self-locking mechanical differential drives, with the cost of such means not always being justified.

An axle drive of a similar type is known from DE 38 21 773 A1 which, in contrast to the above-described drive, is provided with separate external actuating devices for the two friction couplings. In this case, too, control can be independent of the different operating parameters, with the control means providing an additional, improved individual locking effect for the two friction couplings. However, the expenditure (in space, weight, and the like) for energy supply means and control means is doubled.

Similarly-designed assemblies known as Twin Visco-Lok® couplings differ in that the friction couplings are replaced by prior art viscous couplings which are arranged in a common housing and, for each of the two axle shafts, a locking effect relative to the coupling housing is built up automatically in a differential speed sensing way. Such assemblies are simplified in their design as compared to the above-mentioned axle drives and they have the advantage of a differential-speed-dependent locking effect, but as compared to assemblies with mechanical friction couplings, they have a relatively low performance density (the performance/space ratio of the device, i.e., the ratio of the performance of the device to the space occupied by the device) and the disadvantage of independent locking effects at the two axle shafts.

An axle drive of the first-mentioned type is known from DE 44 44 027 C2 wherein two friction coupling units are coupled to the coupling carrier on the one hand and to the two axle shafts on the other hand while being loaded by a Visco-Lok® actuating device, there being a relative speed between an axle shaft and the coupling carrier.

As far as installation space, weight and costs are concerned, the latter Twin Visco-Lok® coupling constitutes an advantageous system in a hang-on configuration wherein the wheels of an axle which is dragged along can be driven if required. A hang-on configuration or system is one in which a four-wheel drive vehicle's rear axle is driven via a coupling which closes only when there is wheel spin at the front axle, i.e., when a speed differential exists between the coupling's input and output shafts. Such an assembly can replace a locking central differential and a locking axle differential.

With a Twin Visco-Lok® coupling which combines the longitudinal and transverse locking effect, it becomes more complicated to adjust the system with respect to traction and braking stability, and there is a tendency of driveline torsion when the vehicle is driven in a circle.

In the above-mentioned publication DE 44 44 027 C2, there is a hydraulic connection between the two actuating devices. A connection between the pressure chambers is proposed, but is disadvantageous in that, if there are different differential speeds of the two axle shafts relative to the coupling carrier, the locking moment for both axle shafts is defined only by the pump with the smaller relative speed, preventing the traction potential of the wheel of the dragged-along axle with the higher friction value to be fully utilized.

It is therefore the object of the present invention to provide an improved process of controlling an axle drive of said type and the respective axle drive which more satisfactorily meets the requirements for a hang-on system in different driving situations.

SUMMARY OF THE INVENTION

The present invention is carried out by and embodied in a method and apparatus for distributing torque from a propulsion shaft to two axle shafts. A coupling carrier is driveable by the propulsion shaft and rotatably supported in an axle drive housing, and two controllable friction couplings are mounted in the coupling carrier for selectively connecting and driving the axle shafts, with first friction plates of each friction coupling being non-rotatably connected to the coupling carrier and with second friction plates of each friction coupling being non-rotatably connected to an associated axle, with actuating devices each comprising an axially-displaceable piston acting on the friction couplings, and pump assemblies which, as a function of the relative rotation between the coupling carrier and the respective axle shaft, build up a fluid pressure which acts on the respective pistons. The objective of the present invention is achieved by providing a process and device in which, when the two axle shafts both rotate in the same direction relative to the coupling carrier, the two pump assemblies function autonomously (independently of one another), and when the two axle shafts rotate in opposite directions relative to the coupling carrier, the two pump assemblies are shut down. The two pump assemblies may be shut down by cross-wise connecting their suction and pressure ends. Also, the suction ends of the two pump assemblies can be connected to a common reservoir when functioning autonomously.

Such a system meets almost all essential requirements, i.e. maximum traction, no driveline torsion when driving the vehicle in a circle, but at the same time exerting a minimum influence on the braking stability in the case of different slip conditions on the two sides of the vehicle or between the different axles of the vehicle.

Although the above-mentioned principles apply to any pump assembly, the preferred embodiment refers to Visco-Lok® pump assemblies which are characterized in that, for each pump assembly, there is provided a pump housing in the coupling carrier; that one piston each is axially displaceable within the pump housings and delimits a pressure chamber at one end; that the pressure chambers are each connected to a reservoir and that the reservoirs and the pressure chambers are filled with a highly viscous fluid; that in each pressure chamber, there is provided a shear-channel-and-control element which, relative to the pump housing, is rotationally moveable between two end positions; and that in each pressure chamber, there is provided one shear plate, each of which is non-rotatably connected to one of the axle shafts; that rotational faces of the shear plate and counter faces of the shear-channel-and-control element form at least one closed shear channel, which closed shear channel is formed by a circumferential groove extending between two ends in the circumferential direction in the shear-channel-and-control element and by a surface of the shear plate covering said groove; that, via channels and grooves arranged in the pump housing and via control apertures provided at the ends of the circumferential grooves in the shear-channel-and-control element, the reservoir can be connected to the pressure chambers in such a way that, in both end positions of a shear-channel-and-control element, the control aperture arranged at the front end of the circumferential groove in the relative direction of rotation communicates with the reservoir; and that the control aperture positioned at the rear end of the circumferential groove in the relative direction of rotation communicates with the pressure chamber, so that, in the case of a relative speed between an axle shaft and the coupling carrier, fluid is conveyed in the shear channel from the reservoir to the pressure chamber. In particular, it is proposed that the coupling carrier forms a common pump housing for both pump assemblies, which are designed symmetrically relative to a common intermediate housing wall, and that the two shear-channel-and-reversing elements rest against the intermediate housing wall. An advantageous inventive design solution consists in that the intermediate housing wall is provided with two radial surface grooves which are positioned back-to-back and which connect the pressure end of the respective shear channel to the respective pressure chamber, and furthermore with two radial inner channels which are positioned at the same circumferential angular distance from the surface grooves and which end in axial through apertures connecting the suction end of the respective shear channel to the reservoir, and finally with two further through-apertures arranged at the same circumferential distance from each of the above-mentioned through-apertures; that the shear-channel-and-control elements, on the side resting against the intermediate housing wall, are provided with a radial surface groove which, in one of the end positions, connects one of the outer additional through-apertures to the pressure chamber; and that the control apertures in the shear-channel-and-reversing elements, in the circumferential direction, simultaneously cover at least one of the through-apertures and one of the additional through apertures in the intermediate housing wall.

The above-mentioned arrangement of cross-wise connections in the intermediate housing wall has a shut-down function when the two axle shafts rotate relative to the coupling carrier in different directions, thereby effectively keeping the connections closed, with each pump functioning autonomously when both axle shafts rotate in the same direction relative to the coupling carrier.

DESCRIPTION OF THE DRAWINGS

The written description of the present invention will be more fully understood when read with reference to the accompanying drawings, of which:

FIG. 4 shows partial developed circumferential sections through the intermediate housing wall in FIG. 2, with the shear-channel-and-control elements of FIG. 3 resting there-against, in four different positions:

a) with the two reversing elements rotating at identical first relative speeds relative to the intermediate housing wall (both leading);

b) with the two reversing elements rotating at different relative speeds in a first sense (first element following, second element leading);

c) with the two reversing elements rotating at identical second relative speeds relative to the intermediate housing wall (both following);

d) with the two reversing elements rotating at different relative speeds in a second sense (first element leading, second element following).

Figure 5:
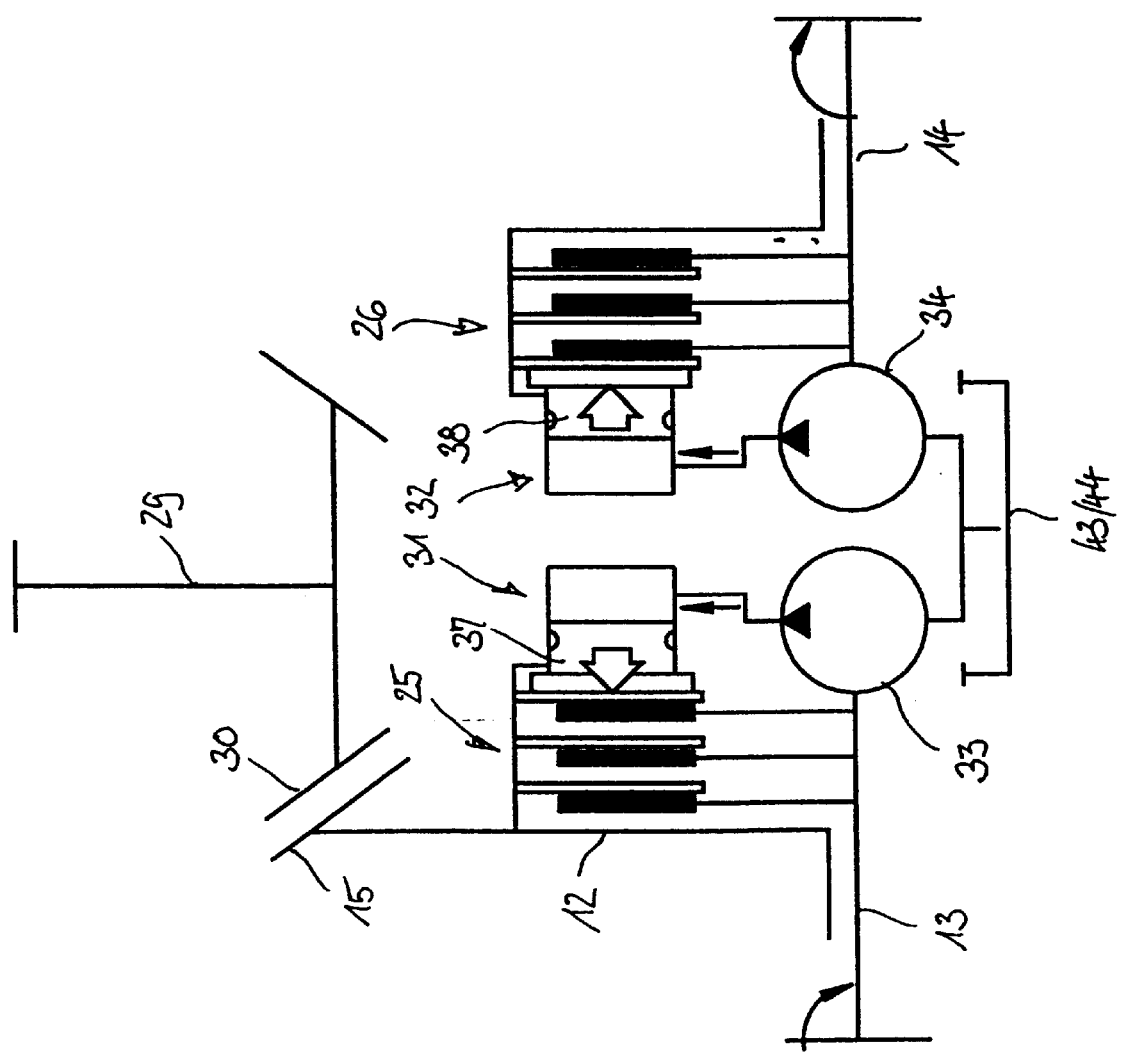

FIG. 5 is a diagram showing the functions of an axle drive embodying and carrying out the present invention in the operational condition shown in FIG. 4a.

Figure 6:
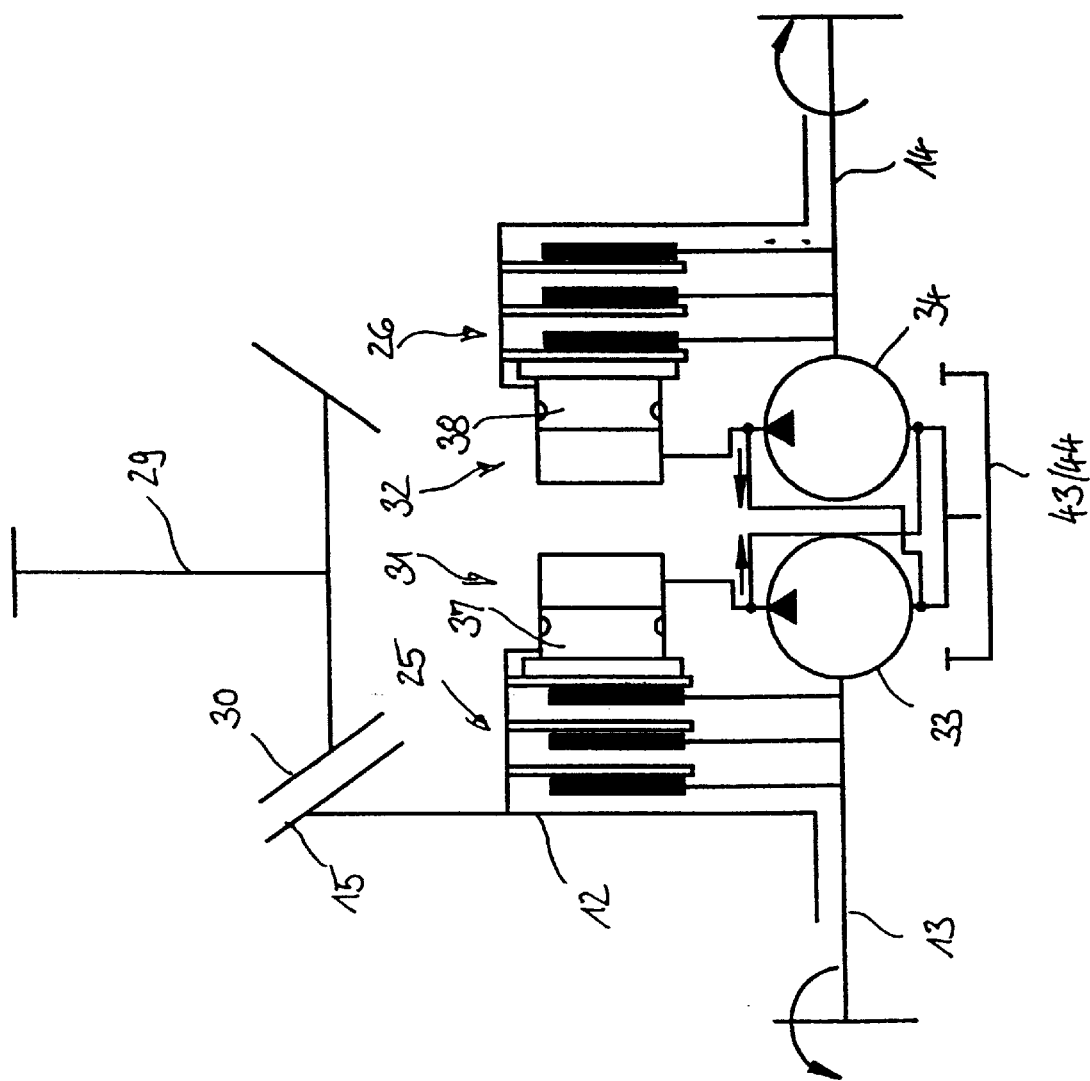

FIG. 6 is a diagram showing the functions of an axle drive embodying and carrying out the present invention in the operational condition shown in FIG. 4b.

DETAILED DESCRIPTION OF THE PREFERRED EMBODIMENT

Figure 1:
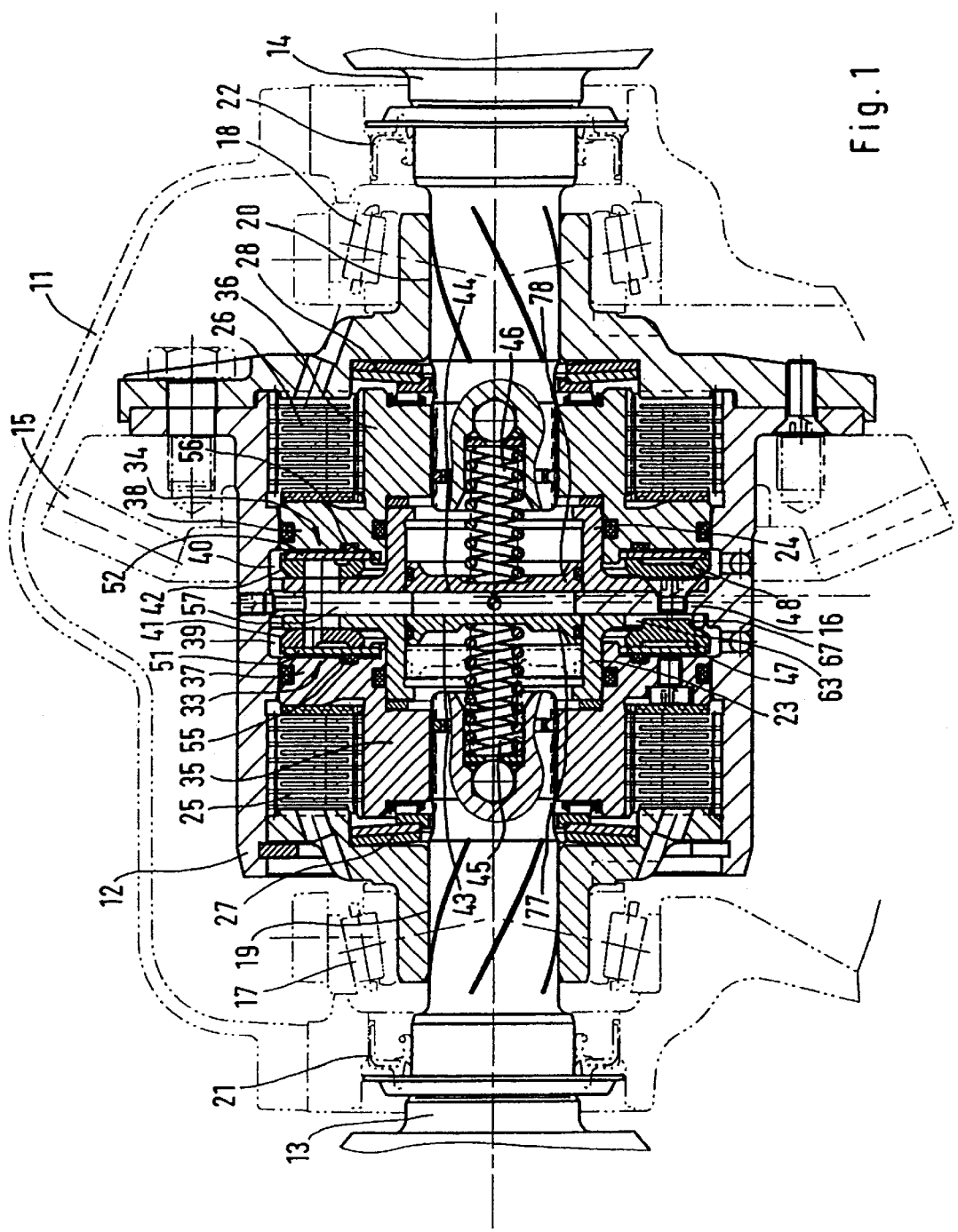
FIG. 1 shows a sectional view of an axle drive embodying and carrying out the present invention, the section being through the longitudinal axis of the axle shafts.

FIG. 1 shows an axle drive with an axle drive housing 11, a coupling carrier 12 rotatably supported therein, and two axle shafts 13, 14 supported in the coupling carrier. The coupling carrier 12 is connected to a crown wheel 15 by means of which it is driveable via pinions by a propulsion shaft extending perpendicularly relative to the shaft of the axle shafts 13, 14. The coupling carrier 12 is provided with a central, radial intermediate housing wall 16. The coupling carrier 12 is supported by roller bearings 17, 18 in the axle drive housing 11. The axle shafts 13, 14 are supported by friction bearings 19, 20 in the coupling carrier 12. The axle drive housing 11 is sealed outwardly by seals 21. 22. In the coupling carrier 12, there are arranged two friction couplings 25, 26 and two pump units 33, 34.

The outer plates of the friction coupling assemblies 25, 26 engage the coupling carrier 12 and inner plates are rigidly connected to hubs 35, 36 which are each non-rotatably secured and axially moveable way to the axle shafts 13, 14. The friction couplings 25, 26 are loaded by first pistons 37, 38 which, in the present embodiment, are formed integrally with the hubs 35, 36. The hubs 35, 36 are therefore axially moveable relative to the axle shafts 13, 14, and are supported by plate springs 27, 28 on the coupling carrier 12.

Sleeve elements 23, 24 are bolted to each side of the intermediate wall 16. The first pistons 37, 38, together with the sleeve elements 23, 24 and the coupling carrier 12, form pressure chambers 39, 40. The pressure chambers 39, 40 contain shear plates 51, 52 and shear-channel-and-control elements 41, 42 which are driven by the hubs 35, 36 and which are provided with circumferential grooves 47, 48. The shear-channel-and-control elements 41, 42 are each rotatable by a limited circumferential angle relative to the coupling carrier 12. For this purpose, they are provided with cams 67 which engage pockets 63 in the sleeve elements 23, 24 with circumferential play. The circumferential grooves 47, 48 are closed by the shear plates 51, 52 which, by toothings, are non-rotatably connected to the pistons 37, 38 and thus, via hubs 35, 36, to the axle shafts 13, 14. Resilient o-rings 55, 56 hold the shear plates 51, 52 in contact with he shear-channel-and-control elements 41, 42. Inside the sleeve elements 23, 24, there are reservoirs 43, 44 whose volumes vary and which are delimited by displaceable second pistons 77, 78. The latter are supported by means of pressure springs 45, 46 on the axle shafts 13, 14. In the intermediate housing wall 16, there is a radial channel 57 which connects the reservoirs 43, 44 via control apertures in the sleeve elements 23, 24 and in the shear-channel-and-control elements 41, 42 to the circumferential grooves 47, 48.

Figure 2:
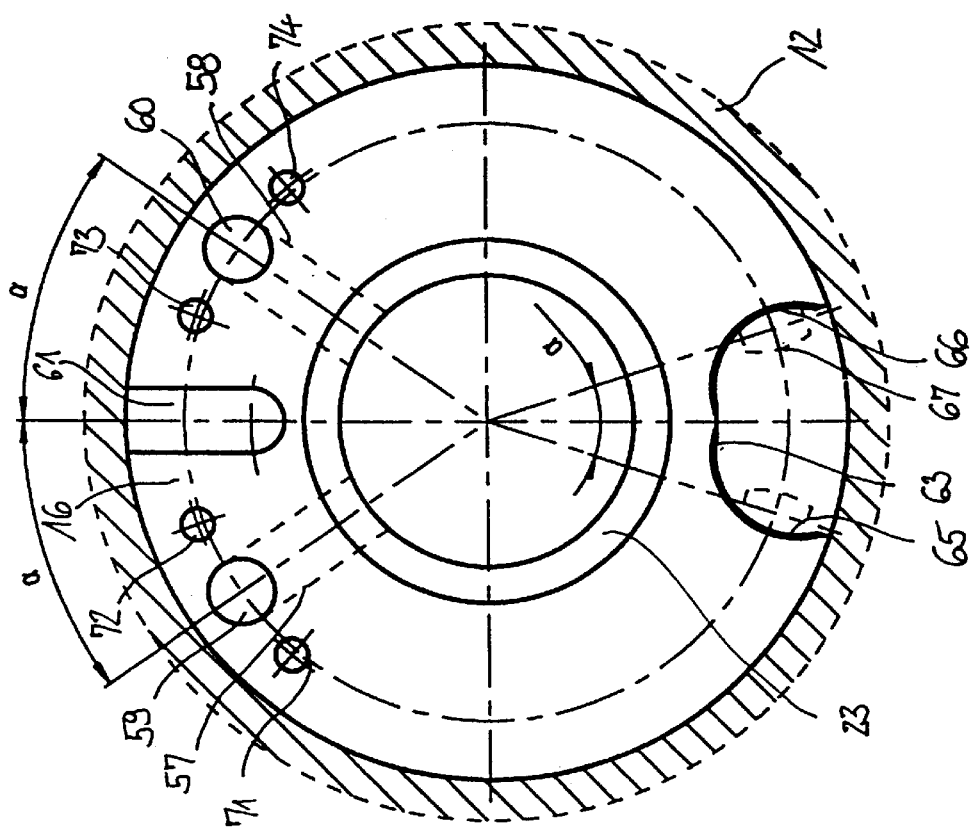
FIG. 2 is an axial view of an intermediate housing wall of the axle drive shown in FIG. 1.

FIG. 2 is a plan view of the intermediate housing wall 16 with the sleeve part 23 resting thereon. It shows, in dashed lines, two radial inner channels 57, 58 in the housing wall 16 which are arranged at an angular distance of 2a relative to one another and which end in axial through apertures 59, 60. A radial groove 61 is arranged symmetrically therebetween and recessed only in the radial wall of the sleeve element 23. Also, the radial wall of the sleeve element 23 is provided with a pocket 63 comprising two stop edges 65, 66 arranged at an effective angular distance of a relative to one another, taking into account the circumferential extension of a cam 67 shown in two positions. Second through-apertures 71, 72, 73, 74 are arranged in pairs and positioned symmetrically relative to the first through-apertures 59, 60. A radial groove corresponding to the radial groove 61 is arranged on the opposite side of the intermediate housing wall 16, with a pocket corresponding to the pocket 63 also being provided on the opposite side.

Figure 3B:
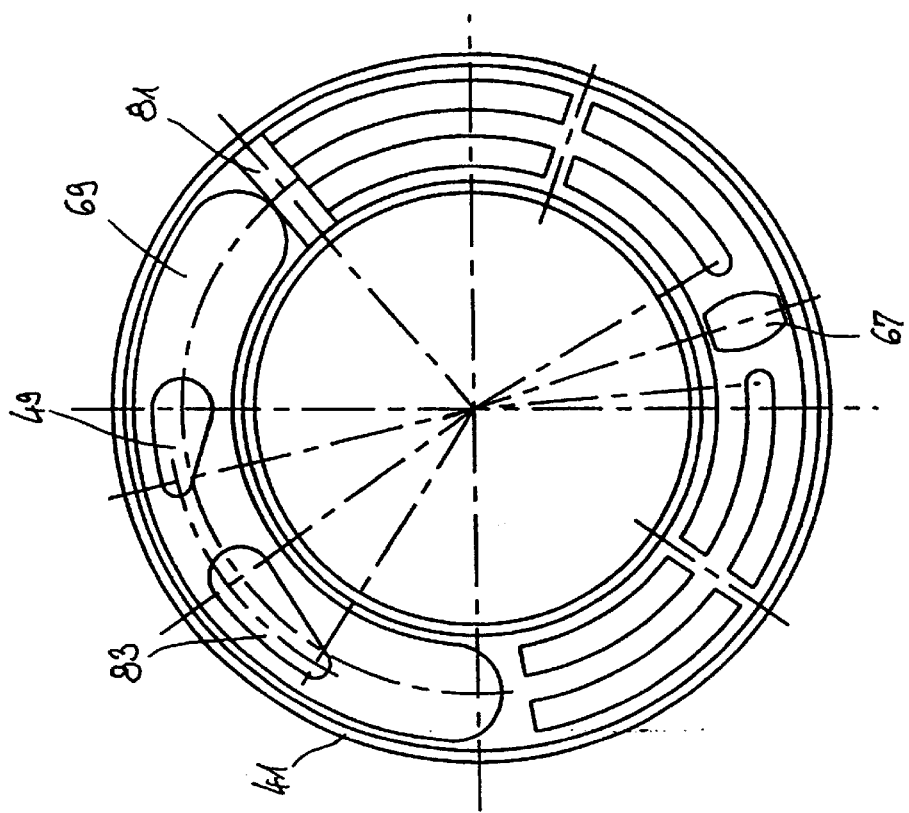
FIGS. 3a and 3b show a shear-channel-and-control element of the axle drive shown in FIG. 1 in a first axial view and a second axial view, respectively.
Figure 3A:
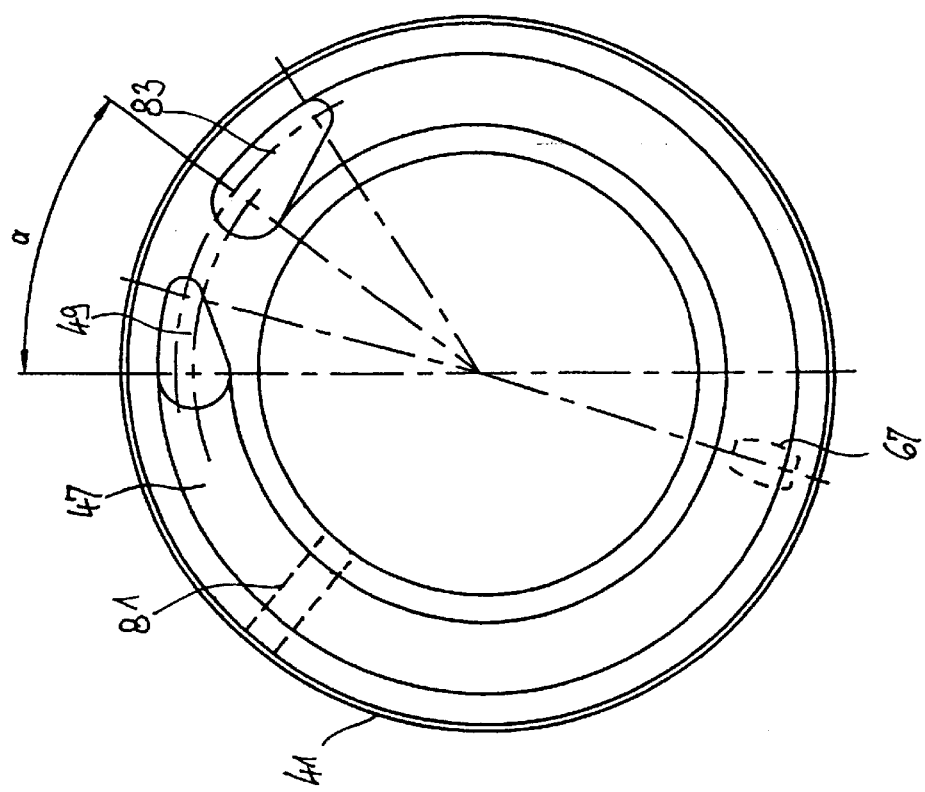

FIGS. 3a and 3b shows one of the shear-channel-and-control elements 41 in two views. FIG. 3a shows the obverse or front side which rests against the shear plate 51, and FIG. 3b shows the reverse side which rests against the radial wall of the sleeve element 23.

On the obverse side, the circumferential groove 47 is provided at its ends with control apertures 49, 83. The reverse side is also shown to have control apertures 83, 49 positioned in the region of a sealing face 69. Also, there is provided a cam 67 which engages the pocket 63, so that the reversing element is rotatable by the angle a relative to the intermediate housing wall. Additionally, the reverse side of the reversing element is shown to have a radial groove 81 which, in the illustrated position of the reversing element 41 relative to the intermediate housing wall, overlaps with the through-hole 71. A further feature on the obverse side is a circumferential groove 47 which is delimited circumferentially and whose ends are provided with drop-shaped control apertures 49, 83 which are of different lengths and of which the shorter one is able to cover one of the through-apertures 71, 72, 73, 74, with the longer one being able to cover one of the through-apertures 72, 73 and one of the radial channels 61, 62. The larger ends of the control apertures 49, 83 whose diameter corresponds to that of the through-apertures 59, 60 are angularly spaced from one another by the angle a.

The second shear-channel-and-control element fully corresponds to the first one so that, with the symmetrical arrangement relative to the intermediate housing wall, the control apertures with their different lengths adjoin one another in opposite directions of rotation.

FIG. 4 shows partial developed circumferential sections through the intermediate housing wall 16 in four variations, the reversing elements 41, 42 contacting the intermediate housing wall 16 and the shear plates 51, 52 contacting the reversing elements 41, 42. The intermediate housing wall is shown to have the inner channels 57, 58 with the through-apertures 59, 60, the radial grooves 61, 62 and the additional through-apertures 71, 72, 73, 74. At the reversing elements 41, 42 are the circumferential grooves 47, 48, which, at their ends, comprise the control apertures 49, 50, 83, 84. Finally, the control elements 41, 42 are provided with the radial grooves 81, 82 that are not visible together in all illustrations. Arrows indicate the relative motion of the shear plates 51, 52 relative to the intermediate housing wall 16. As a result of this relative movement, the respective illustrated positions of the reversing elements 41, 42 are assumed after a very short reversing time. When comparing the individual Figures, it should be noted that the inner channels 57, 58 are each connected to the reservoir so as to be open, with the radial grooves 61, 62 and the radial grooves 81, 82 in the reversing elements being connected to the pressure chambers 39, 40 in the same way.

In FIG. 4a, with identical relative speeds (e.g., leading), the suction ends 58, 60 are connected exclusively via the control apertures 49, 84 and the circumferential grooves 47, 48 in the reversing elements and via the control apertures 83, 50 to the pressure ends 61, 62. The additional through-apertures 71, 72, 73, 74 are covered by at least one of each the control elements 41, 42.

In FIG. 4b, with different relative speeds (upper half following, lower half leading), the suction ends 57, 59, 58, 60 are connected via the control apertures 49, 84, the circumferential grooves 47, 48 and the control apertures 84, 50 to the respective pressure ends 61, 62. The additional through-apertures 71, 72, 73, 74 are covered by at least one of the control elements 41, 42.

In FIG. 4c, with identical relative speeds (following), only the respective suction ends 57, 59 are connected via the control apertures 49, 84, the circumferential grooves 47, 48, and the control apertures 83, 50 to the respective pressure ends 61, 62. The additional through-apertures 71, 72, 73, 74 are covered by at least one of the respective control elements 41, 42.

In FIG. 4d, with different relative speeds (upper half leading, lower half following), the suction ends (57, 59; 58, 60) are connected directly via the control apertures 49, 50, the additional through-apertures 72, 73 and the control apertures 83, 84 to the opposed pressure ends (61, 62).

In FIGS. 5 and 6, containing the same reference numbers, the respective parts are shown symbolically in a diagram indicating the principle involved. Friction couplings 25, 26 are loaded by associated actuating devices 31, 32 whose elements building up pressure, in total, are referred to as pump units 33, 34. In addition to the previously mentioned details, the axle shafts 13, 14 are illustrated symbolically; there is also shown a propulsion shaft 29 with a bevel gear 30 which drives the crown gear 15 at the coupling carrier 12. Arrows indicate the effect of the pistons 37, 38. The suction ends of the pump units 33, 34 are connected to a common reservoir 44.

In FIG. 5, identical circular arrows symbolize the identical relative speeds of the axle shafts 13, 14 relative to the coupling carrier 12 (e.g., leading). The pressure ends of the pump units 33, 34 are connected to the pressure chambers 39, 40.

In FIG. 6, opposed circular arrows (following on the left, leading on the right) symbolize the opposed relative speeds of the axle shafts 13, 14 relative to the coupling carrier 12. The respective suction ends of the pump units 33, 34 are connected cross-wise to the pressure ends, so that the pressure chambers 39, 40 remain pressure-less.

Certain modifications and variations of the disclosed embodiments of the present invention will be apparent to those skilled in the art. It should be understood that the disclosed embodiments are intended to be illustrative only, and not in any way restrictive of the scope of the invention as defined by the claims set forth hereunder.

We claim:

1. A process of controlling an axle drive including the steps of 1) distributing torque from a propulsion shaft to two axle shafts (13, 14) having a coupling carrier (12) which is driveable by the propulsion shaft and rotatably supported in an axle drive housing (11), and two controllable friction couplings (25, 26) arranged in the coupling carrier (12)

2) engageably connecting and driving the axle shafts (13, 14), with first friction plates of each friction coupling (25, 26) being non-rotatably connected to the coupling carrier (12) and with second friction plates of each friction coupling (25, 26) being non-rotatably connected to the respective axle shaft (13, 14), with the actuating devices (31, 32) each comprising an axially displaceable piston (37, 38) acting on the friction couplings (25, 26) and 3) providing pump assemblies (33, 34), which as a function of the relative rotation between the coupling carrier (12) and the respective axle shaft (13, 14), build up a fluid pressure which acts on the respective piston (37, 38), wherein: when said two axle shafts (13, 14) both rotate in the same direction relative to said coupling carrier (12), and two pump assemblies (33, 34) function autonomously independently of one another, and when said two axle shafts (13, 14) rotate in opposite directions relative to the coupling carrier (12), said two pump assemblies (33, 34) are shut down.

2. The process according to claim 1, wherein said two pump assemblies (33, 34) comprise suction and pressure ends, and are shut down by cross-wise connecting said suction and pressure ends.

3. The process according to claim 1, wherein said two pump assemblies (33, 34) comprise suction and pressure ends, and said suction ends of said two pump assemblies (33, 34) are connected to a common reservoir (43, 44) said two pump assemblies (33, 34) are functioning autonomously.

4. An axle drive for distributing torque from a propulsion shaft to two axle shafts (13, 14), having a coupling carrier (12) which is driveable by the propulsion shaft and rotatably supported in an axle drive housing (11), and two controllable friction coupling means (25, 26) arranged in said coupling carrier (12), each operative to engageably connect to and drive an associated one of said axle shafts (13, 14), with each of said friction coupling means (25, 26) comprising first friction plates non-rotatably connected to the coupling carrier (12) and second friction plates non-rotatably connected to an associated axle shaft (13, 14), with a pair of actuating means (31, 32) each comprising an axially displaceable piston (37, 38) acting on said friction couplings (25, 26) and a pump assembly (33, 34), said pump assemblies (33, 34) being operative, as a function of the relative speed between the coupling carrier (12) and the respective axle shaft (13, 14), to build up a fluid pressure which acts on the associated piston (37, 38), wherein: said pump assemblies (33, 34) are operative to function autonomously independently of one another, and said axle drive further comprises control means operative to shut down said two pump assemblies (33, 34) when said two axle shafts (13, 14) rotate in opposite directions relative to said coupling carrier (12).

5. An axle drive according to claim 4, wherein said two pump assemblies (33, 34) comprise suction and pressure ends, and said control means comprises control elements for crosswise connecting the suction and pressure ends of said two pump assemblies (33, 34) for shutting down said two pump assemblies (33, 34).

6. An axle drive according to claim 4, wherein said two pump assemblies (33, 34) comprise suction and pressure ends, and said suction ends of said two pump assemblies (33, 34) are connected to a common reservoir (43, 44) when said two pump assemblies (33, 34) are functioning autonomously.

7. An axle drive according to any one of claims 4 to 6, wherein each of said pump assemblies (33, 34) comprises: a pump housing in said coupling carrier (12); axially-displaceable pistons (37, 38) disposed in said pump housings, each delimiting a pressure chamber (39, 40) at one end; connections from said pressure chambers (39, 40) to one of a pair of reservoirs (43, 44), said pressure chambers (39, 30) being filled with a highly viscous fluid and having a shear-channel-and-control element (41, 42) disposed therein and rotatable to a limited extent between two end positions relative to the pump housing; a shear plate (51, 52) in each pressure chamber (39, 40), each shear plate (51, 52) being non-rotatably connected to one of the axle shafts (13, 14), the rotational faces of each shear plate forming at least one closed shear channel with counter faces of the shear-channel-and-control element, which closed shear channel is formed by a circumferential groove (47, 48) extending between two ends in the circumferential direction in the shear-channel-and-control element (41, 42) and by a surface of the shear plate (51, 51) covering said groove (47, 48), wherein, via channels and grooves arranged in the pump housing and via control apertures (49, 50, 83, 84) provided at the ends of said circumferential grooves (47, 48) in the shear-channel-and-control element (41, 41), said reservoir can be connected to said pressure chambers in such a way that, in both end positions of said shear-channel-and-control element (41, 42), the control aperture provided at the front end of the circumferential groove (47, 48) in the relative direction of rotation communicates with the reservoir and that the control aperture provided at the rear end of the circumferential groove (47, 48) in the relative direction of rotation communicates with the pressure chamber (39, 40), so that, with a relative rotation between an axle shaft and the coupling carrier, fluid is conveyed in the shear channel from the reservoir to the pressure chamber.

8. An axle drive according to claim 7, wherein said coupling carrier (12) forms a common pump housing for both said pump assemblies (33, 34) which are arranged symmetrically relative to said common intermediate housing wall (16), and said shear-channel-and-control elements (41, 42) rest against said intermediate housing wall (16).

9. An axle drive according to claim 8, wherein said intermediate housing wall (16) has two radial surface grooves (61, 62) which are positioned back-to-back and which connect the pressure end of the associated shear channel to the associated pressure chamber (39, 40), and with two radial inner channels (57, 58) which are positioned at the same circumferential angular distance from said surface grooves (61, 62) and which terminate in axial through-apertures (59, 60) connecting the suction end of the respective shear channel to the reservoir (43), and with two further through-apertures (71, 72, 73, 74) arranged at the same circumferential distance from each of said through-apertures (59, 60); said shear-channel-and-control elements (41, 42), on the side resting against said intermediate housing wall, being formed with a radial surface groove (81) which, in one of the end positions, connects one of said outer additional through-apertures (73, 74) to said pressure chamber; and said control apertures (49, 50; 83, 84) in said shear-channel-and-control elements (41, 42), in the circumferential direction, simultaneously cover at least one of the through-apertures (59, 60) and one of said additional through-apertures (71, 72, 73, 74) in said intermediate housing wall (16).

10. An axle drive according to claim 8, wherein said control apertures (49, 50; 83, 84) and said radial grooves (81, 82) in said shear-channel-and-control elements (41, 42) are operative, when both axle shafts (13, 14) rotate in the same direction relative to said coupling carrier (12), to cover and seal all said through-apertures (71, 72, 73, 74) at one end, so that there is no hydraulic connection between said pressure chambers (39, 40), and, when said axle shafts (13, 14) rotate in different directions relative to said coupling carrier (12), said through-apertures (59, 60; 71, 72, 73, 74) in a common intermediate housing wall (16) are partially open so that said suction and pressure ends of said two pump assemblies (33, 34) are connected in a crosswise manner.

* * * * *